United States Patent [19]
Armstrong

[11] Patent Number: 5,810,313
[45] Date of Patent: Sep. 22, 1998

[54] ADJUSTABLE CAMERA SUPPORT

[76] Inventor: J. Richard Armstrong, 10630 Youngworth Rd, Culver City, Calif. 90230

[21] Appl. No.: 816,875

[22] Filed: Mar. 13, 1997

[51] Int. Cl.⁶ .............................. G03B 17/00; A47G 29/00
[52] U.S. Cl. ................................... 248/346.2; 248/176.1; 248/346.06; D6/596; 396/419
[58] Field of Search ................................ 248/176.1, 694, 248/205.2, 346.2, 910, 346.06, 346.03; D16/242; D6/596, 601; 5/911; 396/419, 428

[56] References Cited

U.S. PATENT DOCUMENTS

| | | | |
|---|---|---|---|
| D. 310,677 | 9/1990 | Stidham, Jr. et al. | D16/242 |
| D. 312,650 | 12/1990 | Charrier | 248/346.2 X |
| 1,778,545 | 10/1930 | Allen | 248/687 X |
| 3,704,848 | 12/1972 | Trebes et al. | 396/428 X |
| 4,029,246 | 6/1977 | Woodruff | 396/428 X |
| 4,162,696 | 7/1979 | Sprung | 248/346.2 X |
| 4,473,177 | 9/1984 | Parandes | 396/419 X |
| 4,501,401 | 2/1985 | Conee | 248/346.2 |
| 4,606,524 | 8/1986 | Conee | 248/694 X |
| 4,615,597 | 10/1986 | Buriss | 396/428 |
| 5,350,147 | 9/1994 | Paganus | 248/176.1 X |

*Primary Examiner*—Leslie A. Braun
*Assistant Examiner*—Stephen S. Wentsler
*Attorney, Agent, or Firm*—Beehler & Pavitt

[57] ABSTRACT

An adjustable camera support in the form of a rigid elongated plate which is centrally axially orificed to enable a bolt to be passed up through the plate at different locations and into the customary threaded orifice extending upwardly and inwardly into the underside of a camera. A rubber wash may be disposed on the bolt and interposed between the camera bottom and the top surface of the plate to hold the bolt in position on the plate. The unorificed portion of the underside of the plate is provided with VELCRO material, and engaging material is secured to the top of a flexible "bean bag". Thereby, the camera may be supported by placing the underside of the plate on the top side of the "bean bag" where the camera may be adjustably but securely disposed with further adjustment being attainable by shifting the disposition of the bolt through the plate.

7 Claims, 2 Drawing Sheets

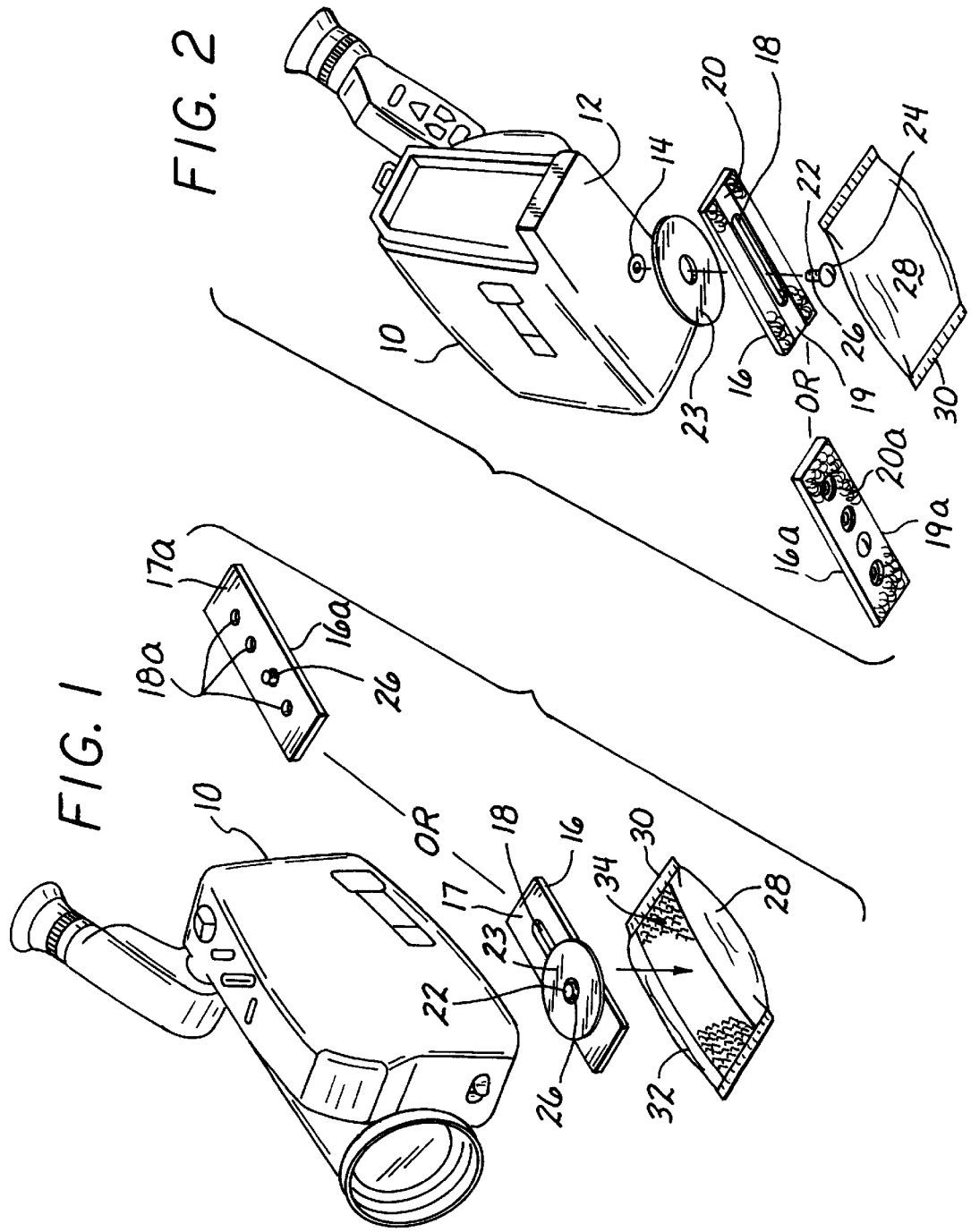

ADJUSTABLE CAMERA SUPPORT

PRIOR APPLICATION

This application is a continuation-in-part of provisional application Ser. No. 60/017,379 filed May 7, 1996.

FIELD OF THE INVENTION

This invention relates to the field of photography with particular application to providing adjustable supports for video cameras and still cameras.

BACKGROUND OF THE INVENTION

It has always been a problem, since cameras were first invented, to support in a steady fixed manner a camera at the instant the shutter is opened or, in recent times, when a tape is running in a video camera. The conventional form of support has been a tripod on which the camera may be mounted in combination with some type of shutter actuating device in which movement of the camera is minimized. Even though shutter speeds have increased, the likelihood of a photograph being blurred is still great when the camera is not placed on the tripod, but remains in the hands of the photographer. Thus, for certain types of photography, tripod support is still desirable. Tourists and other amateur camera users may, however, find setting up a tripod inconvenient or impractical.

With the advent and widespread use in recent years of video cameras, any shaking or movement on the part of the person operating the camera will be reflected in the quality of the images which are picked up on the tape. Thus, most video cameras are provided with a threaded orifice on the underside of the camera housing in order to enable one to place it upon a tripod. Here also, however, setting up a tripod may not only be a time-consuming operation, inconvenient and not practical, particularly when a video camera is to be employed for capturing sports events, family or social gatherings or other impromptu events.

What has been utilized sometimes to provide temporary support is a type of small malleable cushion, sometimes referred to as a "bean bag". Such cushion may comprise a closed envelope of some type of fabric or plastic sheeting which is partially filled with a number of small, sometimes rounded, objects such as B-B's, hard beans or peas, or even iron filings, which may move relative to each other and to any disposition of them within the envelope. A "bean bag" may be placed upon some solid immovable surface, such as a table, desk, chair, post or the like, and the camera then set on the bean bag. The camera may be tilted to a limited degree by pressing it against the "bean bag". Unless moved relative to the bag, the camera should remain in whatever orientation it has been set.

The problem with utilizing a "bean bag" in this manner is that it is quite possible to slide the camera relative to the "bean bag", particularly when an effort is made to switch the camera on or off in the case of a video camera, or to click the shutter, in the case of a still camera. Any such movement can result in a blurred image, or blurred images.

Another problem is that it has been necessary for one to carry the "bean bag" separately from the camera, usually in a pocket or hand bag. Should it be desired immediately to start capturing scenes with the video camera, it is necessary then to fish out the "bean bag" from wherever it has been stored, locate a firm support surface, dispose the "bean bag" on the surface, and then activate the camera. This may require a number of seconds during which a scene or portion thereof will not be captured by the camera.

The conventional use of a "bean bag" support for a camera thus has certain disadvantages.

SUMMARY OF THE INVENTION

The present invention overcomes the disadvantages of the conventional use of a "bean bag" to support a still or video camera by providing means whereby a bean bag support may be secured to the underside of a camera, either temporarily or permanently. Thereby, not only may the bean bag always be ready for use in supporting the camera, but it may be carried as a part of the camera, instead of separately or in a hand bag. Also, the camera will not move relative to the "bean bag".

This attachment to the camera may be accomplished by providing a rigid metal or plastic plate having either a plurality of holes spaced from each other, or a longitudinal slot, through which a bolt may be passed. The shank of a bolt of a size and threading which will fit into the threaded tripod bolt receiving orifice of the camera, may be passed through either the holes or the slotting in the plate, and, when tightened, to the point where the bolt head securely presses the plate against the underside of the camera, will fixedly secure the plate against the bottom of the camera. Desirably, the head of the bolt should be substantially flush with the underside of the plate. This can be accomplished by recessing the bolt receiving orifice, or the slotting on the underside of the plate as shown at 18' in FIG. 3. in addition, to prevent the bolt from falling out of the orifice plate when the bolt is unscrewed from the camera, and to prevent slippage between the underside of the camera and the top of the plate, a rubber washer having an orifice through which the bolt my be threaded, may be interposed between the plate orifice and the camera orifice. The underside of the plate is at least partially covered with hook receiving VELCRO material extending over most of the area of the underside of the plate, excluding the areas immediately surrounding the holes or the slotting in the plate. If hooked VELCRO type material is then provided on the top of the "bean bag" pillow, it is only necessary to bring that material into contact with the VELCRO loops on the underside of the plate. The result will be to disengageably secure the bean bag pillow to the underside of the camera.

A certain degree of tilting is then possible simply by shifting the contents of the bean bag pillow, either forward or rearward, within the pillow. However, further tilting may be accomplished by selecting a different hole in the plate or a different part of the slotting, where slotting is provided in lieu of a plurality of holes, through which the screw is passed to secure the plate to the underside of the camera.

With the "bean bag" thus securely mounted to the underside of the camera, slippage of the camera relative to the "bean bag" becomes impossible. The bean bag will be carried by the camera, until its VELCRO hooks are disengaged from the looped material on the plate. However, should it be desired to transport the camera without the attachments of the present invention, it is a simple matter to first remove the "bean bag" from the plate, and then unscrew the plate from the tripod orifice on the bottom of the camera.

The present invention thus will be found to be most useful for camera operators and particularly for tourists and those who may desire quickly to record on video tapes some event they see occurring, or the antics or other activities of children or others.

DESCRIPTION OF THE DRAWINGS

In the accompanying drawings,

FIG. 1 is a top perspective exploded view illustrating the invention;

FIG. 2 is an underside exploded perspective view of the invention as illustrated in FIG. 1.

DESCRIPTION OF THE PREFERRED EMBODIMENT

Figure 3:
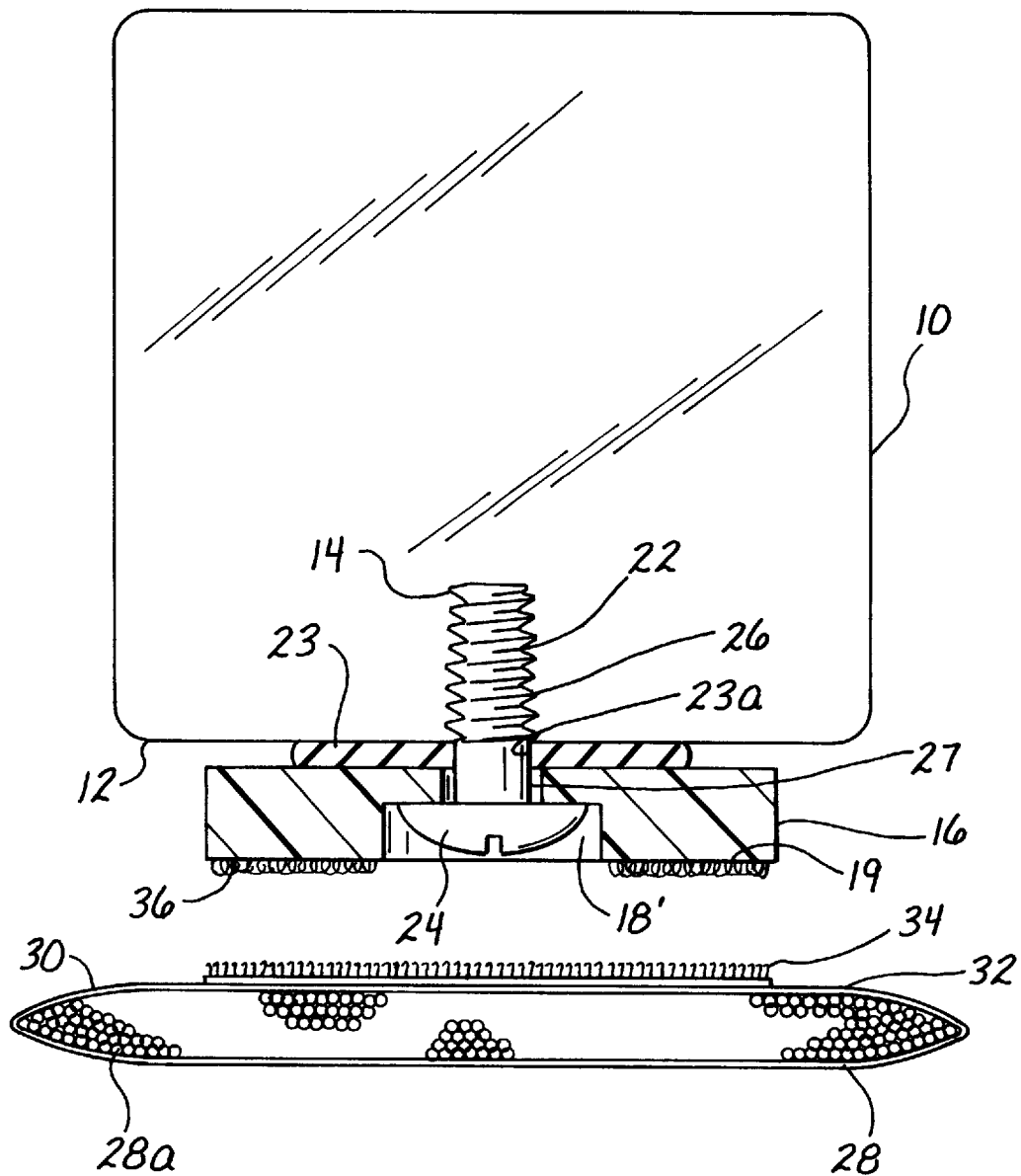
FIG. 3 is an enlarged sectional view of the assembly attached to a camera looking in endwise.

FIGS. 1 and 2 show a typical video camera 10, in the underside 12 of which a threaded orifice 14 is provided to enable the camera to be secured on a tripod (not shown).

The present invention comprises a plate 16 or 16a which is rigid and may be fabricated of either metal or plastic. The plate 16 has a longitudinal slot 18, while the alternate plate 16a may be provided with a plurality of orifices 18a spaced from each other. The underside 19, 19a of the plate 16 or 16a respectively is provided with VELCRO loop material 20, 20a, respectively, which may cover the unorificed or unslotted portion of the underside 19, 19a of the plate 16 or 16a, respectively. A short bolt 22 having a head 24 and a threaded shank 26 with an annular recess 27 is passed through the slotting 18, in the case of the plate 16, or through a preselected one of the holes 18a of the plate 16a; and is threaded into the orifice 14 on the underside 12 of the camera 10. The bolt 22, when tightened in the orifice 14, will secure the plate 16 or 16a against the underside 12 of the camera. In order to inhibit slippage between the underside 12 of the camera 10 and the top side 17, 17a of the plate 16 or 16a, and to prevent loss of the bolt 22 when unscrewed from the underside 12 of the camera 10, a washer 23, preferably made of rubber or neoprene, is provided with a central orifice 23a through which the bolt 22 may be threaded, and interposed between the plate 16 (or 16a) and the underside 12 of the camera 10. The orifice 23a should be of a diameter sufficient to allow the bolt shank 26 to be threaded through the orifice 23a in a close fit so that when the washer 23 reaches the annular recess 27 in the bolt shank 26, the portion of the washer 23 which defines the orifice 23a, will expand against the underside of the innermost part of the threaded shank 26, thereby to prevent the bolt 22 from slipping back out of the washer 23.

A "bean bag" or pillow 28 is provided in the form of an envelope which is partially filled with a plurality of small dry objects 28a, such as dry beans or peas, B-B's or iron filings, so that the form of the bag 28 or pillow may be changed by manipulating it to shift its contents within the envelope 30.

The upper side 32 of the bean bag may be at least partially covered with VELCRO hooking material 34, as best shown in FIGS. 1 and 3.

When VELCRO loop material 36 is secured to the unslotted area of the underside 19 of the plate 16, (or about the holes 18a of the plate 16a), it will be appreciated that the plate 16 may be releasably secured to the top side 32 of the bean bag 28.

From the foregoing, it may be seen that a "bean bag" 28 may be effectively attached to the underside 12 of a camera 10, such as the video camera illustrated herein, to be carried with the camera for immediate use in setting down the camera 10 on a firm supporting surface (not shown) and orienting it with a degree of adjustability in the direction in which the camera is to be pointed. The "bean bag" or pillow 28 may either be carried with the camera for immediate use at all times, or, should it be desired to remove the "bean bag" 28 and its attaching plate 16, this may be easily accomplished by simply disengaging the hook material 34 of the "bean bag" 28 from the hook receiving material 36 of the plate 16 or 16a, and unthreading the bolt 22 from the orifice 14.

The present invention thus will be found to be of great utility for those persons using cameras, particularly where such persons may find it difficult to hold the camera steady in a selected orientation.

I claim:

1. An assembly for providing a tiltable, but stable support for a camera having a planar bottom surface into which extends normal to said surface, a threaded orifice, said assembly comprising:

a rigid plate for attaching to the camera, said rigid plate of a predetermined length, width, and thickness with opposed ends and sides, said plate having upper and lower planar surfaces and being centrally orificed between said upper and lower planar surfaces to enable a threaded element to be passed through the plate at a plurality of different distances from the ends of the plate;

a threaded element having a head, and a threaded shank extending normally from the head and of a length and diameter sufficient to pass through the plate orifice from the lower planar surface of the plate to extend through, and for a predetermined distance beyond, the upper planar surface, the threading on said shank being adapted to mate with the threaded orifice in the camera;

a flexible pillow partially filled with pellets, said pillow having length and width dimensions at least as great as the length and width of the plate, the flexible pillow further comprising an upper surface and a lower surface; and a pair of releasably, mutually engaging fabrics, one being secured on the lower surface of the plate and the other being secured on the upper surface of the pillow;

whereby the direction of orientation of the camera may be changeably set within certain limits either by removably engaging the fabric on the underside of the plate with the mating fabric on the upper side of the pillow and pressing the camera downwardly against the pillow to assume a desired orientation, or by resetting the bolt to pass through a different portion of the orifice or a different orifice, or by both.

2. The assembly as described in claim 1, wherein the central orifice between the upper and lower planar surfaces of the plate is in the form of a slot extending partially lengthwise of the plate and defined by walls in the plate.

3. The assembly as described in claim 2, wherein the slot is recessed along the walls of the plate which define the slot to enable the head of the threaded element, when the bolt is passed through the slot, to be substantially flush with the lower planar surface of the plate, and the fabric disposed on said lower surface is slotted to provide access to the slotting in the plate.

4. The assembly as described in claim 1, wherein a plurality of orifices are provided centrally through the plate, and the fabric on the lower surface of the plate is provided with openings coinciding with the orifices in the plate to permit a bolt to be passed through each of said orifices.

5. The assembly as described in claim 1, wherein a resilient washer is disposed on the upper surface of the plate such that the washer may be interposed between the upper surface of the plate and the planar bottom surface of the camera, said washer being orificed to permit the bolt when passed through the plate orifice to be threaded through said washer orifice before being inserted into the threaded orifice in the lower surface of the camera.

6. The assembly as described in claim 1, wherein the pellets in the pillow are dry beans.

7. The assembly as described in claim 1, wherein the mutual engaging fabrics comprise a hooking member and a mating looped member.

* * * * *